March 3, 1959      J. H. BOOTH      2,876,030
BALL JOINT AND SUPPORT THEREFOR
Filed July 21, 1955
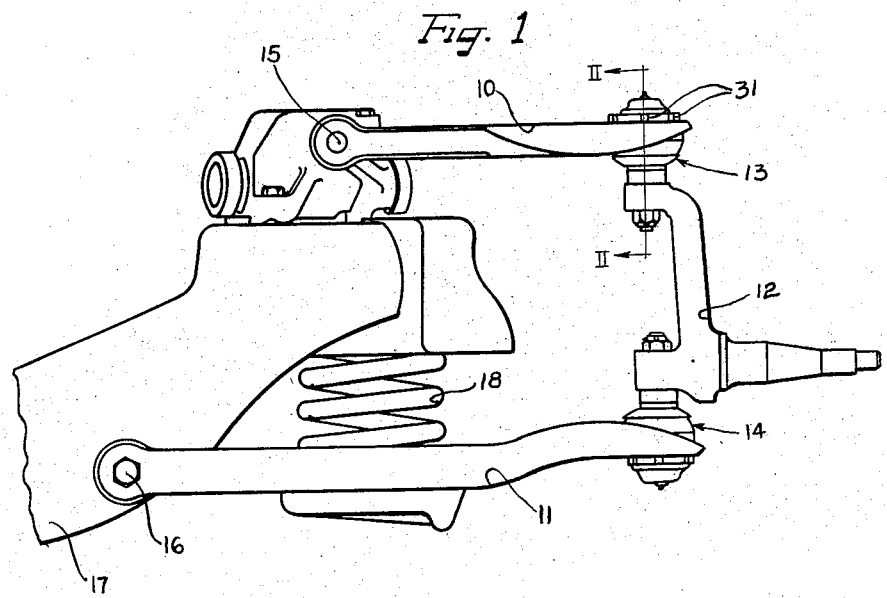
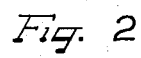
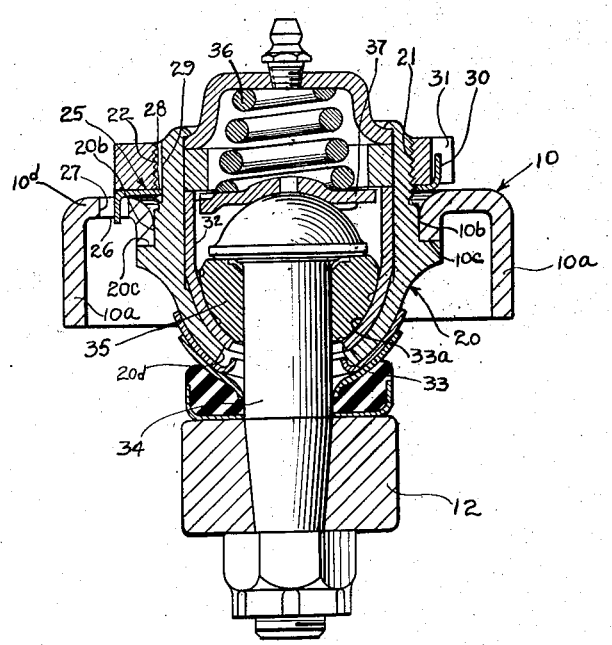
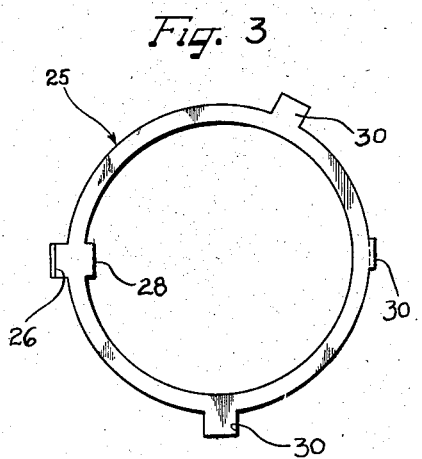
Inventor
James H. Booth

United States Patent Office 2,876,030
Patented Mar. 3, 1959

2,876,030

BALL JOINT AND SUPPORT THEREFOR

James H. Booth, Detroit, Mich., assignor to Thompson Products, Inc., Cleveland, Ohio, a corporation of Ohio Application July 21, 1955, Serial No. 523,522

2 Claims. (Cl. 287—90)

The present invention relates to universal joint connections and, more particularly, is concerned with the provision of an improved mounting arrangement and structure for securing a universal ball joint socket or the like to a supporting member. Specifically, the invention concerns a ball joint construction wherein the ball joint housing is threaded for direct fastening into an aperture in the support member.

Recently, those concerned with the manufacture of universal ball joints and like structures have given considerable consideration to the mounting of universal joints in heavy duty installations, such as for example independent front wheel suspensions utilizing the now well known ball joint connection between the control arms and the steering knuckle. I am aware of the existence in the prior art of ball joint mountings wherein the housing of the ball joint is threaded on its external surface for cooperation with internally facing threads in an aperture formed in a support member. The present invention, however, comprises an improved construction in which the support member itself is not threaded and wherein much more accurate positioning and adjustment of the ball joint housing relative to the control arm or like support may be had without sacrificing any of the advantages of the threaded installation technique. Further, while prior art threaded-housing joints require the application of substantial torque to the ball joint housing during the installation of such housing, the structure of the present invention requires no such torque and accordingly eliminates a source of possible housing deformation which may in some cases seriously hamper effective joint operation or lessen the useful life thereof.

In accordance with the principles of the present invention, the ball joint comprises a stud universally swivelly mounted within a generally cylindrical housing. The housing is provided with an abutment flange on its peripheral surface and is threaded along its peripheral surface at a diameter no greater than the diameter of the peripheral surface at the base of said flange. The housing is then inserted into an aperture in a support member of an internal diameter substantially equal to the diameter of the ball joint housing at the base of the flange and a nut is then threaded onto the threaded portion of the housing on the opposite side of the support member from the flange of the housing. A lock washer is provided for simultaneous locking cooperation with the threaded housing, the support member, and the nut whereby accurate angular positioning of the housing relative to the support member is assured and, at the same time, complete protection against disassembly is accomplished.

In the structure of the present invention the support member is not threaded and accordingly is in no way weakened. Further, the support member is positively compressed between a pair of abutment shoulders and hence rigidification is given the entire assembly.

It is, therefore, an object of the present invention to provide an improved ball joint and ball joint support combination.

Yet another object is to provide a ball joint housing for threaded installation into an apertured support member wherein the housing is angularly fixed in a predetermined relationship to the support member and wherein no threads are necessary in the aperture of the support member.

Still a further object of the present invention is to provide a ball point and socket combination capable of insertion in any number of varying support members having an aperture therethrough of a predetermined standard size.

Another object of the present invention is to provide a more readily assembled ball joint and support member assembly.

A feature of the invention resides in the provision of a ball joint housing having a peripheral flange thereon for seating cooperation with the periphery of an aperture in a support member and having provision on the housing at a point on the opposite side of its support member from the flange for threaded retaining engagement with a nut.

Still a further feature of the invention is the provision of a three-way angular position locating lock washer for the simultaneous positioning of a ball joint housing relative to its supporting member and locking of a securing nut to the housing and to the supporting member.

Still a further object of the present invention is to provide a ball joint housing of the type adapted for direct threaded securement to a support member wherein torque necessarily applied in such securement is applied to a separable nut member rather than to the ball joint housing itself.

Still other and further objects and features of the present invention will at once become apparent to those skilled in the art from a consideration of the attached drawings wherein a preferred form of the invention is shown by way of illustration only and, wherein:

Figure 1 is a front elevational view of one side of an independently sprung vehicle front wheel suspension;

Figure 2 is a cross-sectional view taken along the line II—II of Figure 1 and illustrating a construction of the joint of the present invention; and Figure 3 is a plan view of a lock washer constructed for use in accordance with the principles of the present invention.

As shown on the drawings:

As illustrated in Figure 1, one important use of the structures of the present invention may be found in automotive vehicle front wheel suspensions. As there shown, such a suspension comprises an upper control arm 10, a lower control arm 11 and a vehicle wheel steering knuckle 12 universally pivotally supported to the control arms through the respective ball joint assemblies indicated at 13 and 14. The control arms are, in turn, pivotally mounted about horizontal axes 15 and 16 to the rigid transverse frame member 17 of the vehicle. A spring 18 is provided between the frame 17 and the lower control arm 11 to control the vertical displacement of the steering knuckle 12.

In accordance with the present invention, the joints 13 and 14 preferably take the form generally set forth in Figure 2 wherein a cross-section of the joint 13 and the upper control arm 10 is set forth. As may be seen, the control arm 10 is constructed of heavy gauge sheet metal having generally vertical rigidifying walls 10a and a pierced and flanged aperture 10b having a circular abutment surface 10c for cooperation with a cylindrical surface 20b and 20c respectively on a universal ball joint housing 20.

The housing 20 is provided with external threads 21 having a maximum outside diameter the same as or smaller than the diameter of the surface 20b and extends a substantial distance beyond the upper surface 10d of the control arm 10. An internally threaded nut 22 is threaded under the threads 21 and into compressive engagement with the surface 10d whereby a compressive load is applied to the control arm at the abutment surfaces 10c and 10d.

Preferably, the cylindrical surface 20b on the housing 20 is cylindrical and without projecting keys or the like since the provision of such angular irregularities greatly increases the cost of manufacture. In order to fix the housing 20 against rotation within the aperture 10d and at the same time permit the manufacture of the housing 20 as a turned part, at least as far as the finishing operations are concerned, a three-way lock washer 25 is provided. The operation of this washer is shown in Figures 2 and 3 where a first prong 26 projects into a pierced aperture 27 in the control arm 10, a second prong 28 projects into a locating slot 29 in the housing 20 and a third projection 30 projects into any one of a plurality of peripheral castellations 31 on the nut 22. By this arrangement, the single lock washer 25 simultaneously positively locks the housing 20 in a predetermined angular position relative to the control arm 10, through the projections 26 and 28 and at the same time positively prevents the nut 22 from rotation relative to either the control arm 10 or the housing 20 through the upwardly bent projections 30.

It will thus be seen that the only processing necessary in order to provide satisfactory angular indexing between the housing 20 and the control arm 10 are the piercing of the small aperture 27 in the control arm 10, a step readily accomplished during the piercing of the major aperture 10b, and an axial milling of the slot 29 in the housing 20. Both of these operations are metal removing operations and accordingly do not require upsetting, or other forging or welding operations. The angular positioning feature may, of course, be omitted readily in the present structure since it does not comprise a projection of any sort on the housing 20. Accordingly, the housing 20 and the ball joint structure therein may be utilized in unlimited applications whether or not angular fixation is desired or necessary. In the present illustration, when the parts are associated with an independent front wheel suspension, it is desirable that the housing 20 be fixed against rotation since the particular ball joint internal parts are preferably constructed to provide a wide angle of tilt about an axis parallel to the horizontal axis parallel to the longitudinal axis of the vehicle and a relatively small amount of tilt about a horizontal axis parallel to the frame member 17.

The dual angularity above mentioned is accomplished in the joint illustrated in Figure 2 through the utilization of a housing liner 32 having an elliptical opening 33 for cooperation with the stud 34. In the view shown in Figure 2, which faces the frame member 17, the liner on narrow axis of the elliptical opening 33 is shown. The major axis of the generally elliptical opening 33 lies on a line generally perpendicular to the drawing in Figure 2 and permits a substantially greater tilt of the stud 34 toward and away from the frame 17. This substantial angle of tilt permits wide variations in angular pivoting motion of the control arms 10 and 11 and is, of course, unnecessary in the plane perpendicular thereto since the pivots 15 and 16 do not permit fore and aft movement of the control arms 10 and 11 under normal conditions. By providing a reduced opening 33, through constriction of its sides, additional bearing surface 33a is provided and the danger of disassembly by pulling the stud 34 through the opening 33 and the housing opening 20d is minimized. It will be understood that the specific construction of the stud 34, segmental spherical bearing ring 35, spring 36 and pressure plate 37 may be varied with the intended purpose of the assembly and comprise in the illustration here made an optimum design for an upper control arm joint.

It will be apparent to those skilled in the art that the structure hereinabove described provides a superior and yet relatively inexpensive connection between a ball joint housing and a supporting member. Through utilization of the structure herein shown, the ball joint housing may be positively angularly fixed independently of any starting or ending points of the thread 21. Further, no threading whatever is necessary in the aperture 10b. The resulting assembled combination of parts 10, 20, and 22 provides an extremely rigid unit in which the flanged wall of the aperture 10b is positively compressed between the housing abutment shoulder 20c and the nut 22. The rigidity of the generally cylindrical housing 20 and the flanged aperture 10b accordingly complement each other to provide an unusually strong control arm 10 and distortion free housing 20. Further, as a result of the utilization of a nut 22 for securing the housing 20 to the arm 10, all torques applied in tightening are applied to the nut 22 rather than to the housing 20 thereby preventing deformations of the housing 20 which sometimes result from improper use of torque tools during the rapid initial assembly or subsequent servicing.

While the three-way washer 25 provides an unusually simple and effective over-all locking mechanism it will be understood that in certain utilizations it may be necessary or desirable to provide direct anti-rotation interaction between the housing 20 and the arm 10. In such installations, it is considered within the scope of the present invention to continue the slot 29 downwardly along the peripheral surface of the housing 20 to a point adjacent the flange 20c for cooperation with a radially inwardly projecting stamped finger in the flanged wall of the aperture 10b. Alternatively, of course, a projection may be provided on the housing 20 for cooperation with a recess in the flanged wall of the aperture 10b.

It will be understood that adjustment of the housing 20 relative to the arm 10 may be provided within the scope of the present invention. Such adjustment may be accomplished by inserting shim washers between abutment surfaces 10c and 20c.

It will thus be observed that I have provided a novel and substantially improved ball joint and supporting member assembly. Since it is apparent that variations and modifications other than those discussed above may be made in accordance with the concepts of the present invention it is my intention that the scope of the present invention be limited solely by that of the hereinafter appended claims.

I claim as my invention:

1. In a ball joint and support member combination, a joint housing having a generally cylindrical peripheral surface with an axially extending slot therein, a support member having a generally circular aperture sized for receiving said peripheral surface of the housing and having a recess adjacent said aperture, threads on said housing, an internally threaded element engaging said threads and clamping the support member between said element and said abutment means, said element having a rotation preventing abutment thereon, and a three-way lock washer surrounding said joint housing having a first projection on the inner periphery thereof extending into said slot, a second projection on the outer periphery thereof extending into said recess in the support member, and a third projection engaging said abutment of said element, at least one of said projections on the lock washer being circumferentially spaced from the other projections and said lock washer being effective to prevent relative rotation of said housing, said support member and said internally threaded element.

2. An independent front wheel suspension comprising a control arm having a substantially vertical aperture therein, a recess in said arm adjacent said aperture, a joint housing having a peripheral surface of substantially the same configuration and diameter as said aperture, said housing having a slot in the periphery thereof, abutment means projecting from said peripheral surface of said housing for axial cooperation with an end face of said control arm adjacent said control arm aperture, threads on said housing and extending on said housing to a point on the opposite side of said control arm from said abutment when said housing is assembled in said control arm, an internally threaded element threaded onto said housing for clamping said control arm between said abutment and said element in rigid relation, rotation preventing abutment means on said internally threaded element, and a three-way lock washer associated with said element, said control arm and said housing for preventing rotation of any of them relative to the others, said washer comprising an annulus surrounding said housing and having a first projection on the inner periphery thereof extending into said slot in the housing, a second projection on the outer periphery thereof extending into said recess in the control arm, and a third projection engaging said rotation preventing abutment of said element, and at least one of said projections of said washer being circumferentially spaced from the other projections.

References Cited in the file of this patent

UNITED STATES PATENTS

| | | |
|---|---|---|
| 1,922,929 | Chamberlain | Aug. 15, 1933 |
| 2,211,817 | Hufferd et al. | Aug. 20, 1944 |
| 2,351,356 | Meyer | June 13, 1944 |
| 2,727,766 | Grashow | Dec. 20, 1955 |

FOREIGN PATENTS

| | | |
|---|---|---|
| 630,181 | Germany | May 22, 1936 |